(12) United States Patent
Murphy et al.

(10) Patent No.: US 6,523,404 B1
(45) Date of Patent: Feb. 25, 2003

(54) APPARATUS FOR MEASURING A FLUID LEVEL

(75) Inventors: Michael E. Murphy, Covington, KY (US); Sean K. Scott, Rockford, MI (US); Leslie N. Rogers, Jr., Kingston, TN (US)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 09/483,187

(22) Filed: Jan. 14, 2000

(51) Int. Cl.$^7$ .................... G01F 23/30; G01F 23/34; G01F 23/50; G01F 23/76
(52) U.S. Cl. ................ 73/305; 73/310; 73/319; 73/320; 73/321; 73/322.5
(58) Field of Search ................ 73/305, 307, 308, 73/310, 319, 320, 321, 322.5

(56) References Cited

U.S. PATENT DOCUMENTS

| | | | |
|---|---|---|---|
| 219,702 A | 9/1879 | Eckhoff | 73/321 |
| 1,255,178 A | 2/1918 | Keyzer | |
| 1,696,512 A | 12/1928 | White | |
| 1,918,672 A | 7/1933 | Szabo | |
| 2,511,632 A | 6/1950 | Gregory | |
| 2,600,341 A | 6/1952 | Thompson | |
| 2,713,794 A | 7/1955 | Burns | |
| 2,949,777 A | 8/1960 | Ferron | |
| 3,148,542 A | 9/1964 | Clift, Jr. | |
| 3,482,447 A | 12/1969 | Bennett | |
| RE27,767 E | 10/1973 | Schoepflin | |
| 4,078,430 A | 3/1978 | Pemberton et al. | |
| 4,092,861 A | 6/1978 | Fling | |
| 4,116,062 A | 9/1978 | Reip | |
| 4,147,060 A | 4/1979 | Fling et al. | 73/321 |
| 4,244,219 A | 1/1981 | Takahashi | |
| 4,255,859 A | 3/1981 | Klieman | |
| 4,339,950 A | 7/1982 | Lendino | |
| 4,571,998 A | 2/1986 | Stegner | |
| 4,709,653 A | 12/1987 | Salomon | |
| 4,819,484 A | 4/1989 | White | |
| 4,988,978 A | 1/1991 | Soto | |
| 5,144,836 A | 9/1992 | Webb | |
| 5,209,106 A * | 5/1993 | Carlin | 73/319 |

FOREIGN PATENT DOCUMENTS

GB  1105118  3/1968

OTHER PUBLICATIONS

Steil Safety Gage Co., Inc. Literature; Undated.

* cited by examiner

Primary Examiner—Daniel S. Larkin
(74) Attorney, Agent, or Firm—Dinsmore & Shohl LLP (57) ABSTRACT

An apparatus for measuring a fluid level in a tank comprises a housing including a level indicator for displaying a measured fluid level in the tank. A rod extends from the housing and a float is adapted to travel along the rod. A first end of an elongated flexible member is attached to the float and an opposite end of the elongated flexible member is attached to a spool. The spool stores at least a portion of the elongated flexible member. The apparatus further includes a spring adapted to urge the spool to automatically uptake portions of the elongated flexible member as the float travels towards the housing and to allow the elongated flexible member to unwind from the spool as the float travels away from the housing.

34 Claims, 6 Drawing Sheets

APPARATUS FOR MEASURING A FLUID LEVEL

FIELD OF THE INVENTION

This invention relates generally to apparatus for measuring fluid levels, and more particularly to apparatus for measuring fluid levels in a tank, for example, an above ground storage tank.

BACKGROUND OF THE INVENTION

It is often desirable to determine a fluid level in a closed reservoir or container. For instance, it is important to determine the fluid level in an above ground tank, often over an extended period of time. Above ground tanks typically have a capped opening at the top of the tank where a conventional dip stick may be inserted for measuring the fluid level. As the capped openings are often positioned some distance off the ground, it is typically inconvenient and potentially dangerous for an operator to climb up to the capped opening to perform the measurement. Moreover, measuring the fluid level with a conventional dip stick requires removal of the cap, whereby vapors can escape from the interior of the tank. It will be appreciated that this can be a significant disadvantage for tanks which contain fluids of environmental concern, particularly when periodic or repeated measurements are desired. Thus, there is a continuing need for improved devices for measuring a fluid level.

SUMMARY OF THE INVENTION

Accordingly, it is an object of the present invention to obviate problems and shortcomings of conventional devices used to measure a fluid level. More particularly, it is an object of the present invention to provide an apparatus for measuring a fluid level in a tank, for example, an above ground tank.

It is a further object of the present invention to provide a fluid level measuring apparatus which may facilitate the display of a measured fluid level to an observer standing adjacent the tank.

It is a further object of the present invention to provide a fluid level measuring apparatus which may be used with a variety of tank sizes and tank opening orientations.

It is a further object of the present invention to provide a fluid level measuring apparatus which may be mounted on a conventional capped vent opening of a tank.

To achieve the foregoing and other objects and in accordance with the present invention, apparatus for measuring fluid levels are provided. The apparatus include a housing including a level indicator for displaying a measured fluid level and at least one rod extending from the housing. A float is adapted to travel along the rod and a first end of an elongated flexible member is attached to the float. The opposite end of the elongated flexible member is attached to a spool for storing at least a portion of the elongated flexible member. The apparatus further comprise a biasing member for urging the spool to automatically uptake portions of the elongated flexible member as the float travels towards the housing and for allowing the elongated flexible member to unwind from the spool as the float travels away from the housing.

The fluid measuring apparatus of the present invention are advantageous in that they facilitate fluid level measurements in a tank, for example an above ground storage tank. Still other advantages of the present invention will become apparent to those skilled in the art from the following description wherein there are shown and described alternative exemplary embodiments of this invention. As will be realized, the invention is capable of other different, obvious aspects and embodiments, all without departing from the invention. Accordingly, the drawings and descriptions should be regarded as illustrative in nature and not as restrictive.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

DETAILED DESCRIPTION

The invention is directed to apparatus for measuring a fluid level, and is particularly advantageous for use with tanks and the like. One skilled in the art will appreciate however that the fluid level measuring apparatus described herein may be used, without limitation, in a variety of different environments in addition to tanks.

Figure 1:
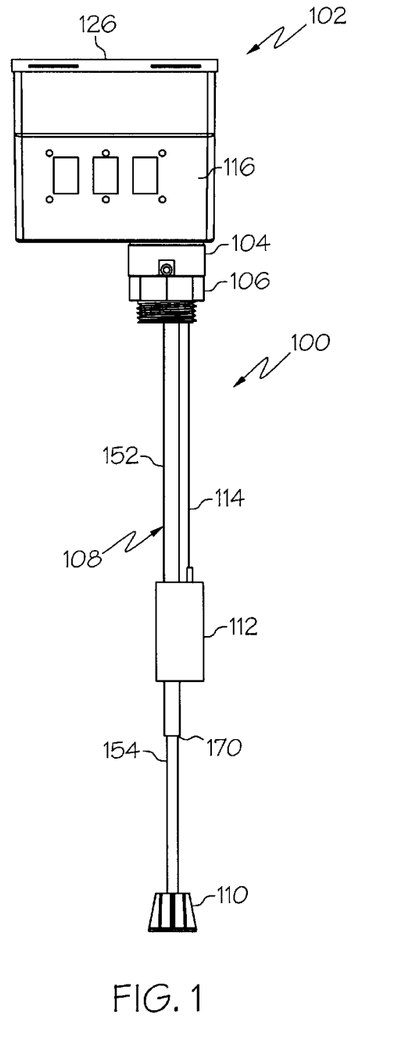
FIG. 1 is a front elevational view of an apparatus in accordance with the present invention.
Figure 2:
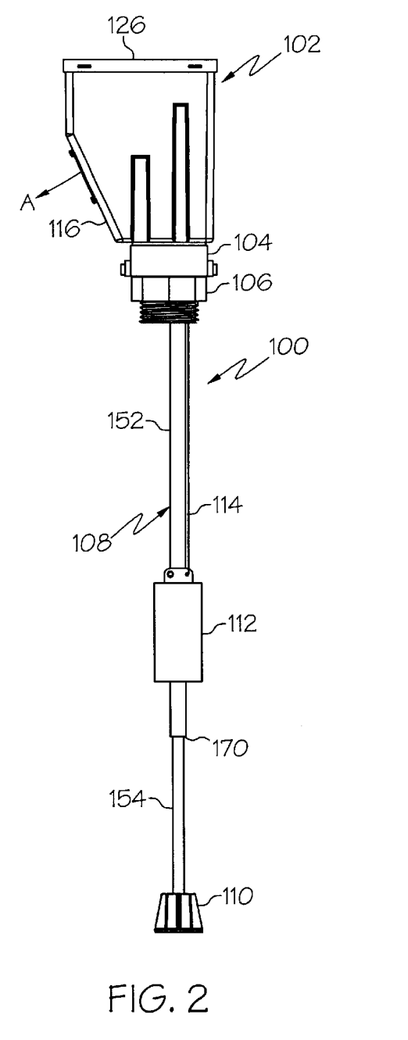
FIG. 2 is a side elevational view of an apparatus in accordance with the present invention.
Figure 3:
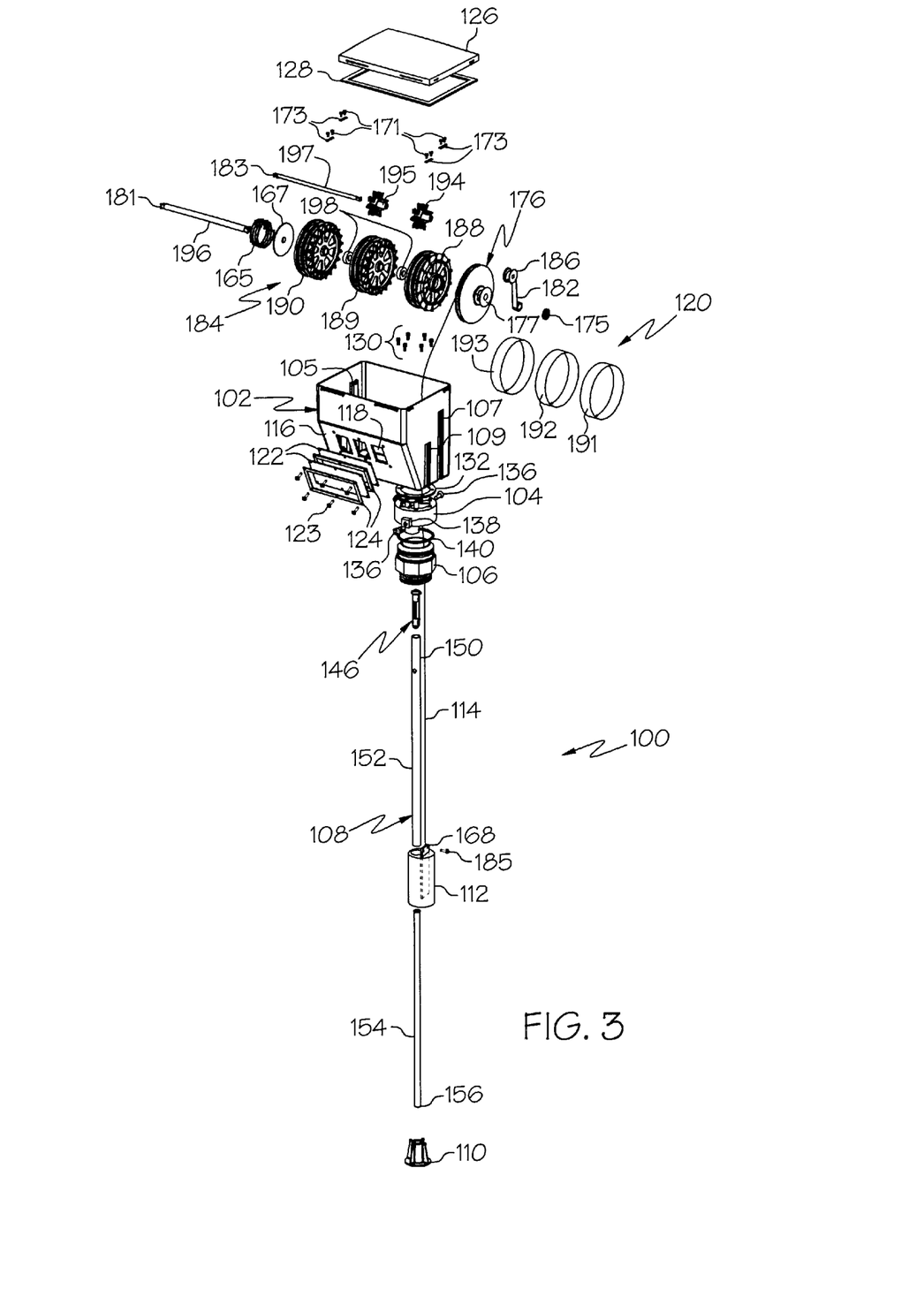
FIG. 3 is an exploded view of an apparatus in accordance with the present invention.

As shown in FIGS. 1–3, fluid level measuring apparatus 100 includes a housing 102 provided with a level indicator 184 (FIG. 3) therein adapted to display a measured fluid level. A rod 108 extends from the housing 102 and defines a travel path for a float 112. An elongated flexible member 114 is attached to the float 112 for locating the position of the float 112 along the rod 108. As noted above, the apparatus 100 is useful in measuring fluid levels in a variety of environments. In one application, the apparatus 100 is mounted on a tank 200 for measuring the fluid level 204 of a fluid 206 in an above ground tank 202, as shown in FIG.

Figure 15:
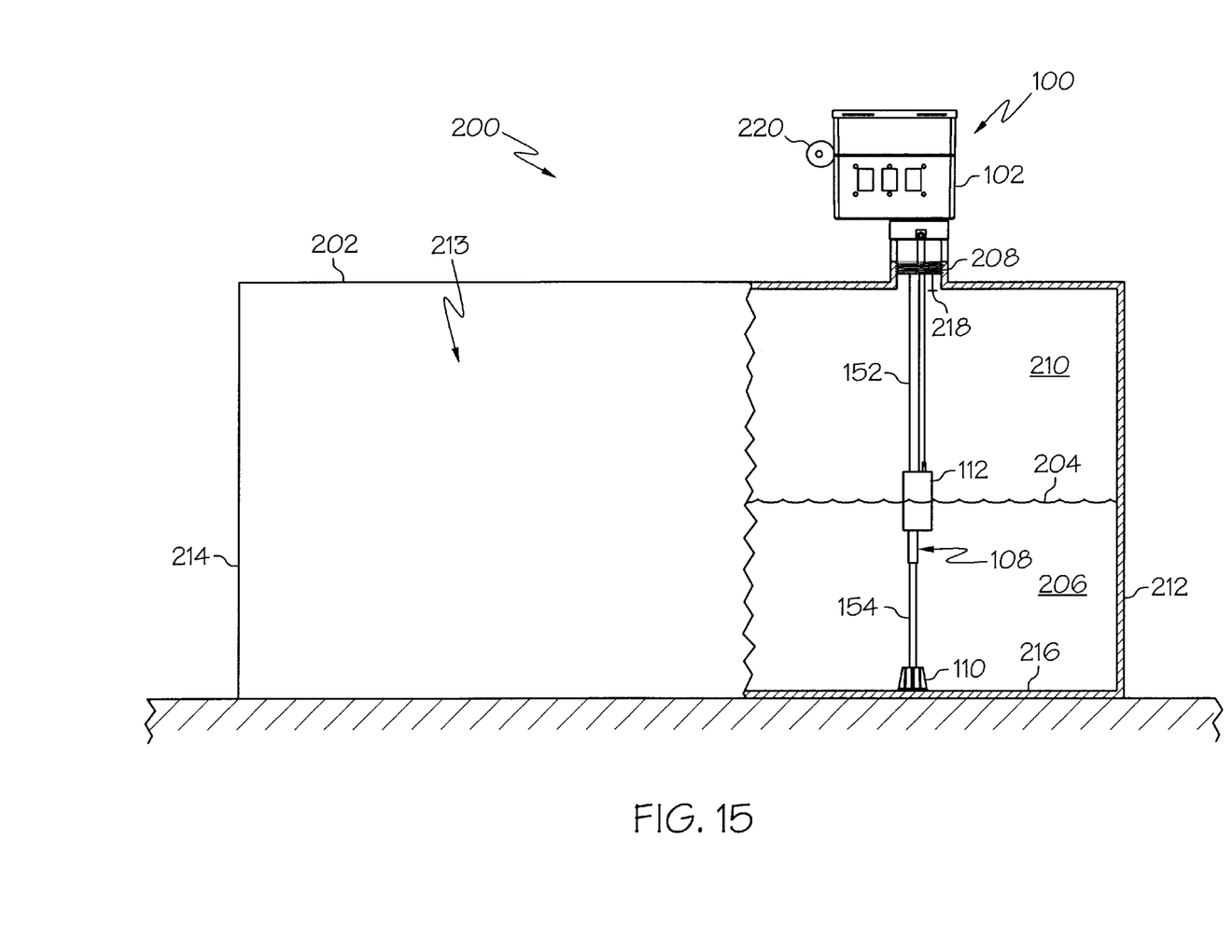
FIG. 15 is an elevational view of a tank assembly according to the present invention.

15. The rod 108 and float 112 are inserted through a conventional top opening 208 of the tank, from which a screw cap or the like has been removed, and into the interior 210 of the tank 202. After calibration, which will be described in detail below, is performed, the apparatus 100 may be used to measure the fluid level 204 in the tank 202, displaying the measured level information in the direction of an observer standing adjacent the tank 202.

As shown in FIG. 3, in one embodiment of the apparatus 100, the housing 102 is provided with one or more cut-out windows 118 for displaying indicia from the level indicator 184. Lenses 122 and gaskets 124 may be attached to the housing 102 at the windows in order to prevent vapor leakage and to protect the interior of the housing 102 from contamination while allowing the indicia to be viewed. The use of two lenses 122 tends to reduce the formation of condensation. The lenses 122 and gaskets 124 may be attached to the interior of the housing with one gasket positioned between the housing 102 and the first lens 122 and the other gasket positioned between the first and second lenses 122. An at least partially transparent label cover (not shown) may be placed over the front of the housing to cover the cut-out windows 118 and provides indicia adjacent the cut-out windows 118 indicating the units of measurement corresponding to the indicia appearing in windows 118. The lenses 122, gaskets 124, and label cover (if included) may be attached to the housing 102 with any suitable fasteners, with rivets 123 being shown in FIG. 3.

The housing 102 may optionally be provided with a removable lid 126 to provide access to the interior of the housing 102 to facilitate calibration, cleaning, or other maintenance. The lid 126 may conveniently have a snapping connection to the remainder of the housing 102 to allow toolless entry to the interior of the housing 102. A gasket 128 may be used in combination with the lid 126 to prevent vapor leakage and to protect the interior of the housing 102 from contamination.

In one embodiment, the housing 102 includes an angled face 116 to facilitate displaying the information in a direction toward an observer. When the apparatus 100 is used in connection with an above ground tank 202, the angled face 116 displays a measured fluid level in a direction A, as shown in FIG. 2, such that the measurement information is directed downwardly and outwardly from the housing 102 to a user observing from a lower position, i.e. the ground. It is understood that the angle of the front face will depend on the orientation of the user relative to the housing. For instance, the housing could be provided with a vertical front face in an application where the user observes the information directly to one side of the housing. Similarly, the housing could be provided with a front face directed upwardly and outwardly in an application where the user observes the information from above as would be the case with an apparatus used with an underground tank.

In a further embodiment, the housing 102 is rotatable about a vertical axis so that the windows 118 and angled face 116, if included, may be positioned in any desired direction. The housing 102 has an infinitely adjustable rotation angle about the vertical axis of 360 degrees or more. For instance, as shown in FIG. 15, the housing 102 is directed outwardly from a front side 213 of the tank 202. The housing 102, could also be rotated such that it faces either the right side 212, the left side 214, or rearwardly toward a rear side of the tank 202 depending on the location of an observer. Importantly, in this embodiment, rotation of the housing to accommodate the observation of fluid level information does not interfere with accurate measurement of fluid levels.

Figures 9, 10:
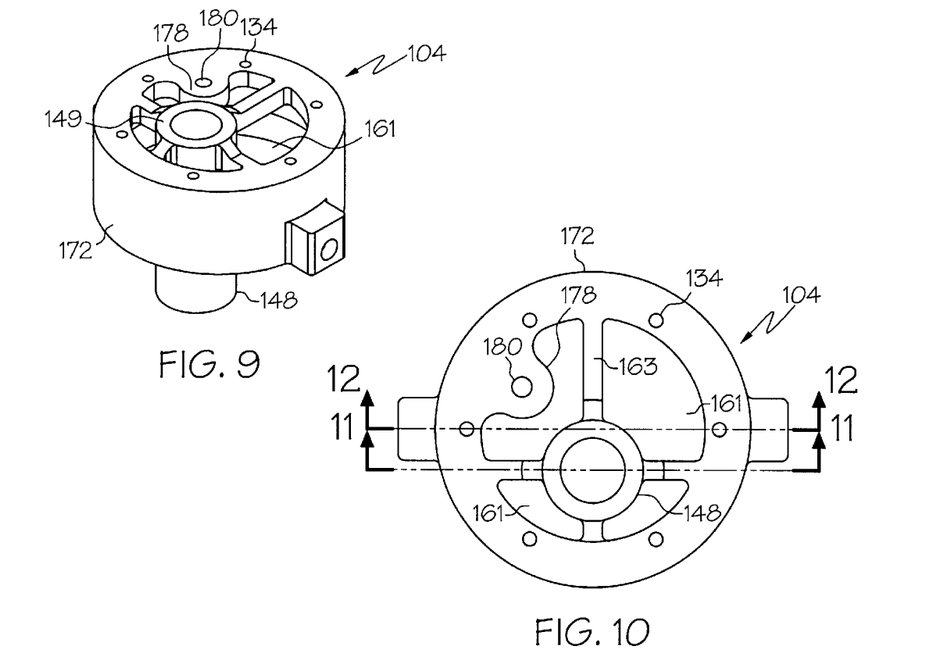
FIG. 9 is a perspective view of a swivel top in accordance with the present invention.
FIG. 10 is a top plan view of the swivel top of FIG. 9.
Figure 11:
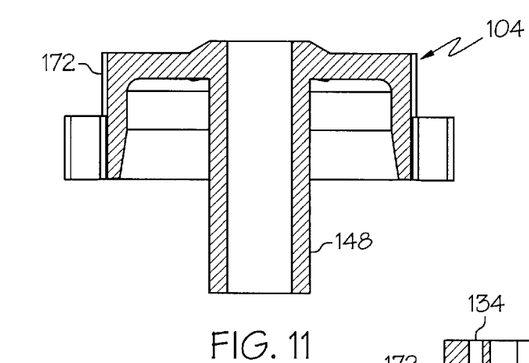
FIG. 11 is a cross sectional view taken along line 11—11 of the swivel top of FIG. 10.

More particularly, as shown in FIG. 3, the housing 102 is rotatable by a swivel connection between a swivel top 104 and a swivel bottom 106. The swivel top 104 is connected with the bottom of the housing 102 with fasteners such as screws 130 to be nonrotatable with respect to the housing. A swivel top gasket 132 may be provided to prevent vapor leakage and to protect the interior of the apparatus 100 from contamination. The fasteners 130 pass through fastener openings (not shown) formed in a lower portion of the housing 102, through openings in the gasket 132, and through openings 134 formed in the upper portion of the swivel top 104 as best seen in FIGS. 3, 9, and 10. The swivel top 104 may be formed from any durable non-corrosive material, examples of which include, but are not limited to, polymers such as polyketones, for example Carilon® aliphatic polyketones, acetal resins, for example, those available under the Delrin® series from Dupont, polypropylene, or polyethylene, or may be formed of a metal, such as stainless steel or aluminum, or the like. The swivel bottom 106 similarly may be fabricated from any such durable, non-corrosive material. In one embodiment, the swivel top 104 is formed of a non-corrosive polymer such as Carilon® or Delrin® and the swivel bottom 106 is formed of stainless steel or aluminum.

Figure 4:
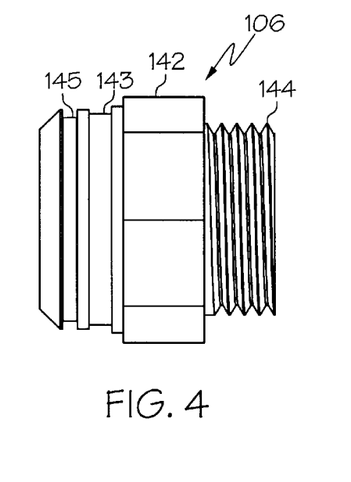
FIG. 4 is a side elevational view of one embodiment of a swivel bottom included in an apparatus in accordance with the present invention.
Figure 5:
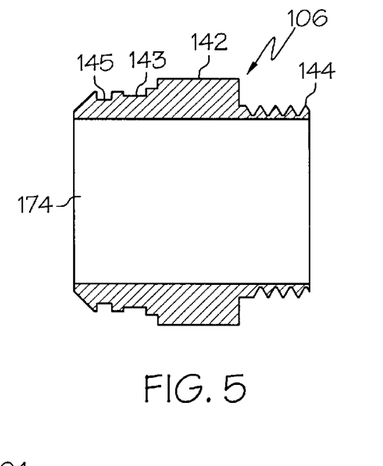
FIG. 5 is a cross section of the swivel bottom of FIG. 4.
Figure 12:
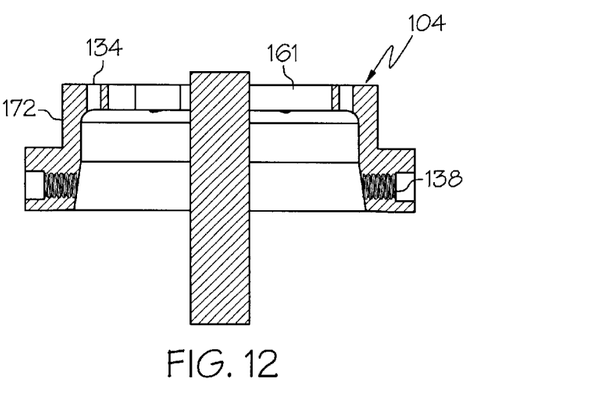
FIG. 12 is a cross sectional view taken along line 12—12 of the swivel top of FIG. 10.

The swivel bottom 106 is rotationally connected to the swivel top 104. While any rotatable connection may be used, in one embodiment the swivel bottom 106 is rotatably connected with the swivel top 104 with fasteners, such as one or more set screws 136. The set screws 136 engage threaded openings 138 provided in the swivel top 104 as shown in FIG. 12 and extend into a set screw groove 143 provided in the swivel bottom 106 as shown in FIGS. 4 and 5. Sufficient loosening of the set screws will allow the swivel bottom 106 to be separated from the swivel top 104. Advancing the screws such that the set screws 136 at least slightly extend into the set screw groove 143 prevents the swivel top 104 from being removed from the swivel bottom 106 since an interference will occur between the shoulders of the set screw groove 143 and the set screws 136. At this point, without the screws being tightened, the swivel top 104, and the housing 102 connected with the swivel top 104, are rotatable relative to the swivel bottom 106. The set screws 136 may also be tightened such that the set screws 136 apply a sufficient force to prevent the swivel top 104 from rotating relative to the swivel bottom 106. Preventing relative rotation would be desirable once the apparatus 100 has been installed and it is desirable to maintain a desired orientation of the housing 102. Optionally, an O-ring 140 may be inserted in an O-ring groove 145 of the swivel bottom 106 to prevent vapor leakage between the swivel top 104 and the swivel bottom 106 and to protect the interior of the apparatus 100 from contamination.

Figure 6:
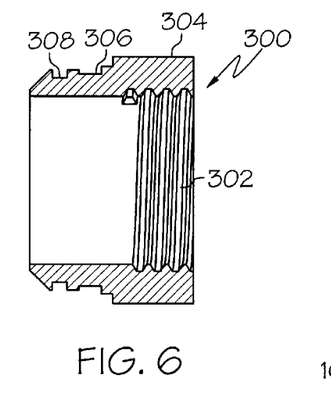
FIG. 6 is a cross section of another embodiment of a swivel bottom included in an apparatus in accordance with the present invention.

As further shown in FIGS. 4 and 5, the swivel bottom 106 may include an exterior surface portion 142 shaped to engage a conventional torquing tool, such as a wrench. The swivel bottom 106 may be adapted for secure, non-rotatable mounting on a tank, and preferably on a conventional opening of a tank, such as a capped vent opening. For example, the swivel bottom 106 may include a threaded portion having exterior male threads 144 for engaging an interior female threaded opening 208 of a tank 202 as shown in FIG. 15. FIG. 6 shows an alternative embodiment comprising a swivel bottom 300 wherein the threaded portion comprises interior female threads 302 for engaging a tank opening having exterior male threads. The alternative embodiment comprising swivel bottom 300 otherwise includes the elements of the swivel bottom 106 of FIGS. 4 and 5, including a set screw groove 306, an O-ring groove 308, and an exterior surface portion 304 shaped to engage a conventional torquing tool, such as a wrench.

As shown in FIG. 3, a snap connecting member 146 may be used to connect the rod 108 to the swivel top 104, although other connectors known in the art may be used. In one embodiment, the snap member 146 may be snapped into a proximal end 150 of the rod 108, and then connected with the swivel top 104. For example, as shown in FIGS. 9 and 10, the proximal end 150 of the rod 108 and the snap member 146 are inserted into a connecting tube 148 of the swivel top 104 until a top portion of the snap member 146 snaps over a top 149 of the connecting tube 148. As shown in FIGS. 9–12, the connecting tube 148 is attached to a side wall 172 of the swivel top 104 by connecting members 163 extending radially from the connecting tube 148 to the side wall 172. Passageways 161 are thereby formed to extend through the swivel top 104. One of ordinary skill will appreciate that in the assembled operational form, the snap member 146 with the rod 108 connected thereto will extend through the interior passageway 174 of the swivel bottom 106, to extend into the tank. One of ordinary skill will also appreciate that other types of connectors known in the art may be employed to connect the rod 108 to the swivel top 104, which in turn is connected to the housing 102 including the level indicator 184 therein.

The rod 108 may be adjustable to facilitate its use in different sized tanks. In one embodiment, a structural arrangement may be used that will provide self-adjustability. For example, the adjustable rod 108 may comprise a first rod 152 and a second rod 154 in telescoping relation to the first rod 152. In such an arrangement, it is desirable to maintain a low coefficient of friction between the first rod 152 and the second rod 154 to encourage the telescoping relationship. The abutting ends of the first rod 152 and second rod 154 may be knurled to prevent disassembly and the rods may be rotatable relative to one another or may be keyed to prevent relative rotation. While two rods are shown, three or more adjustable rods may be provided for a more compact design and/or to accommodate use with a wider variety of tank sizes.

As shown in FIG. 15, after the apparatus 100 is installed on the tank 202, the weight of the second rod 154 causes the second rod 154, and any additional telescoping rods 154, to telescope from the first rod 152 until a distal end portion 156 rests adjacent, at or on a bottom 216 of the tank 202. The rod 108 may be constructed from stainless steel, aluminum, or other non-corrosive material.

A foot 110 may be attached to the distal end portion 156 of the rod to protect the bottom 216 of the tank 202 from being damaged by extension of the second or subsequent rod 154, for instance, during installation or use of the apparatus 100. The foot 110 may also assist in preventing the float 112 from contacting sludge or debris located in the bottom 216 of the tank 202. The foot may also be sized to prevent the float 112 from traveling off the rod 108. The foot 110 may be fabricated from a Delrin® material or other non-corrosive material.

Figure 7:
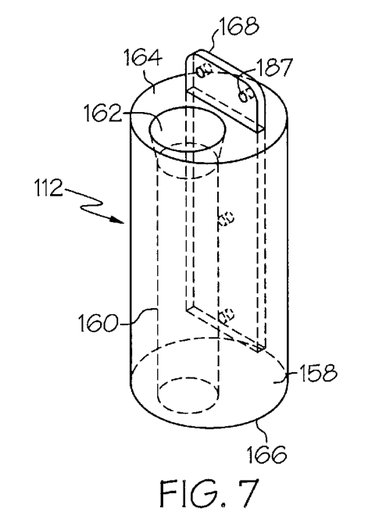
FIG. 7 is a perspective view of a float in accordance with the present invention.
Figure 8:
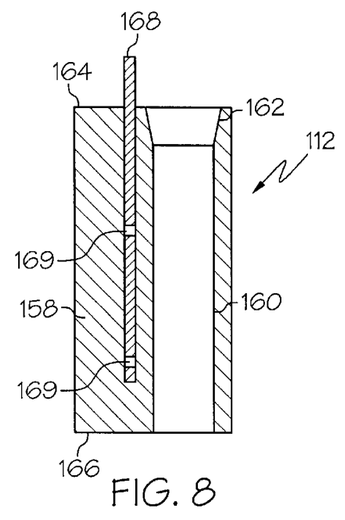
FIG. 8 is a cross sectional view of the float of FIG. 7.

As shown in FIGS. 7 and 8, the float 112 includes a buoyant body 158 formed from buoyant material. Many types of buoyant materials are known and may be used, it being preferred that the material resists corrosion by the fluid to be measured. A closed cell buna-N foam is an exemplary material. It is understood that other material may be used to provide the buoyant body 158. For instance, the buoyant body could be formed from an at least partially hollow plastic or metallic floatation device. In one embodiment of the float 112, the buoyant body 158 has a first end 164 and a second end 166 with a through hole 160 extending through the buoyant body 158 from the first end 164 to the second end 166. The rod 108 extends through the through hole 160, such that the float is capable of traveling along the rod. The float 112 may travel into the interior passageway 174 of the swivel bottom 106, but is prevented by the connecting tube 148 from traveling into the housing 102. As shown in FIG. 8, the through hole 160 may be provided with at least one beveled end portion 162 for allowing the float 112 to easily travel over a shoulder, such as shown by reference, number 170 in FIGS. 1 and 2, when traveling from the second rod 154 to the first rod 152. A beveled end portion may be provided at both ends of the through hole 160 in an application where the rod 108 has shoulders in both directions. As shown in FIGS. 7 and 8, the beveled end portion 162 may have a conical elongated surface to facilitate its travel along a cylindrical surface of a rod 108 having a circular cross section.

The flexible member 114 is attached at its first end to the float 112 by any suitable connector. In one embodiment, the float 112 may include a bracket 168 embedded, molded, or formed in, or otherwise attached to, the buoyant body 158. As shown in FIGS. 7 and 8, the bracket 168 is embedded in the buoyant body 158. The bracket 168 distributes stress applied by the elongated flexible member 114 to the buoyant body 158, thereby preventing the failure of the connection between the elongated flexible member 114 and the float 112. The bracket 168 may be provided with vertical holes 169 that receive portions of the buoyant body 158 when the bracket 168 is embedded in the buoyant body 158. The vertical holes 169 with portions of the buoyant body 158 located therein increases the strength of the structural connection between the bracket 168 and the buoyant body 158.

The elongated flexible member 114 may be in the form of a filament, wire, cable, chain, or other flexible member and is attached at its first end to the float 112. For instance, the elongated flexible member 114 may be connected at a hole 187 in the bracket 168 of the float 112 by a fastener, such as a rivet 185, or by any other type of connector known in the art. As shown in FIG. 7, the bracket 168 may be formed with two holes 187 offset to opposite sides of the bracket 168. The offset holes 187 assist in aligning the elongated flexible member 114 relative to a spool 176 to which the second end of the elongated flexible member 114 is connected. Providing a pair of holes, each alternative hole working equally well, assists in the attachment of the elongated flexible member 114 to the float 112. The elongated flexible member 114 extends from the float through the interior passageway 174 of the swivel bottom 106 and the swivel top 104 and is attached at its second, opposite end to the spool 176 in the interior of the housing 102. As will be discussed in further detail below, the spool 176 is adapted to store at least a portion of the elongated flexible member 114. As shown in FIGS. 9 and 10, in one embodiment, the swivel top 104 may include an inward tab 178 formed with a guide hole 180. The elongated flexible member 114 is threaded through the guide hole 180 to direct the elongated flexible member 114 through a corresponding hole (not shown) in the bottom of the housing to the spool 176.

As shown in FIG. 3, the apparatus 100 includes a biasing member which urges or biases the spool 176 to uptake the excess length of the elongated flexible member 114 as the float moves toward the housing. For example, the biasing member may comprise a constant torsion spring 182 which urges the spool 176 to automatically uptake portions or lengths of the elongated flexible member 114 as the float 112 travels towards the level indicator 184, but which allows the elongated flexible member 114 to unwind from the spool 176 as the float 112 travels away from the level indicator 184. The torsion spring 182 may be attached to a portion 177 of the spool 176 by any suitable fastener, such as a screw. Portions of the spring 182 may also be partially coiled on a storage spool 186. A bushing 175 may be provided to reduce the friction between the spool 176 and the housing 102.

Figure 13:
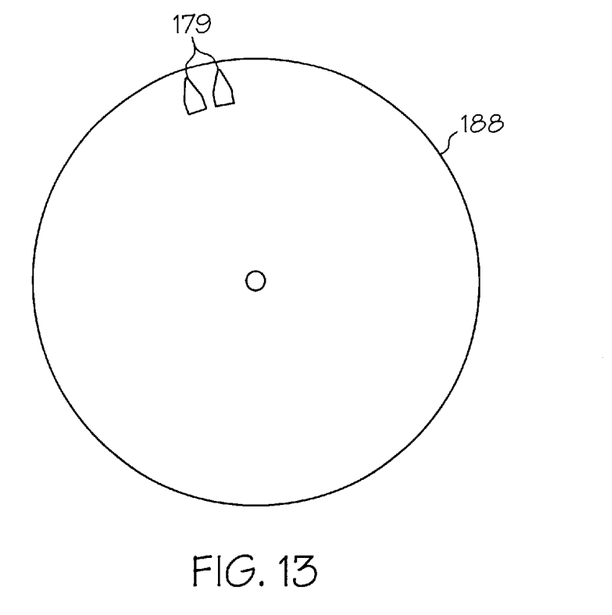
FIG. 13 is a plan view of one side of a gear according to the present invention.

The level indicator 184 translates linear movement of the float along the rod into measured fluid level information by a mechanical or electrical device. For instance, the level indicator may include an electrical device with a digital readout using digital display technology known in the art. In one embodiment, the level indicator 184 includes a mechanical device including one or more gears or a plurality of gears in communication with the spool 176. For example, in the embodiment shown in FIG. 3, the level indicator 184 includes a first gear 188, a second gear 189, and a third gear 190, each of which is provided with a label 120 bearing indicia relating to fluid measurement units. The first gear 188 is in direct communication with the spool 176 such that any rotation of the spool 176 results in a rotation of the first gear 188. The first gear 188 includes a first label 191 having indicia corresponding to, for example, a sub-unit of measurement. After the first gear 188 makes one fill rotation, a counter associated with the gear, such as teeth 179 of the first gear 188 shown in FIG. 13, contacts a protruding tooth of a first indexing gear 194, thereby partially rotating the first indexing gear 194. The first indexing gear 194 then causes an incremental rotation of the second gear 189. The second gear 189 includes a second label 192 indicating, for example, a single digit of a unit of measurement. After one full rotation of the second gear 189, a counter associated with the gear, similar to teeth 179, contacts a protruding tooth of a second indexing gear 195, thereby partially rotating the second indexing gear 195. The second indexing gear 195 then causes an incremental rotation of the third gear 190. The third gear 190 includes a third label 193 indicating, for example, a tens digit of the unit of measurement. Hence, the second gear 189 and the third gear 190 provide a double digit readout (e.g., in feet or meters) while the first gear 188 provides a sub-unit of measurement (e.g., in inches or centimeters). In order to reduce costs and simplify fabrication, the third gear 190 may also have teeth 179 although the teeth will not engage an index gear. Hence, the same mold could be used to form the gears. One skilled in the art will appreciate that more or less than three gears associated with or bearing indicia may be used in such an arrangement.

With further reference to FIG. 3, the three gears 188, 189, 190 and the spool 176 are rotatably mounted in the housing 102 in any desirable manner. In one embodiment, the gears and spool are mounted on a first shaft 196. The first shaft 196 has opposite keyed ends 181 for mounting in correspondingly shaped keyed recesses formed in the ends 105 of grooves 109 in the interior of the housing 102. A corresponding bracket 173 is secured with fasteners such as corresponding screws 171 to non-rotatably secure the first shaft 196 to the housing 102. The first and second indexing gears 194 and 195 and the storage spool 186 are similarly rotatably mounted in the housing 102 in any desired manner. For example, the indexing gears and storage spool may be mounted on a second shaft 197 having opposite keyed ends 183 for mounting in correspondingly shaped keyed recesses formed in the ends 105 of grooves 107 in the interior of the housing 102. A corresponding bracket 173 is secured with fasteners such as corresponding screws 171 to non-rotatably secure the second shaft 197 to the housing 102. The grooves 107, 109 are formed to provide the ends 105 for mounting the rods 197 and 196, respectively, in the housing. Forming the ends 105 by using grooves helps maintain a constant thickness of the housing 102 formed, for example by molding, and assists in the removal of the housing from the mold after formation. Bushings 198 may be provided to reduce the friction between the gears 188, 189, and 190, and a biasing compression spring 165 may be provided to apply lateral pressure to a spring guide 167 which in turn biases the first gear 188, the second gear 189, the third gear 190, the spool 176, the first indexing gear 194, and the second indexing gear 195 together in a cooperating relationship.

Figure 14:
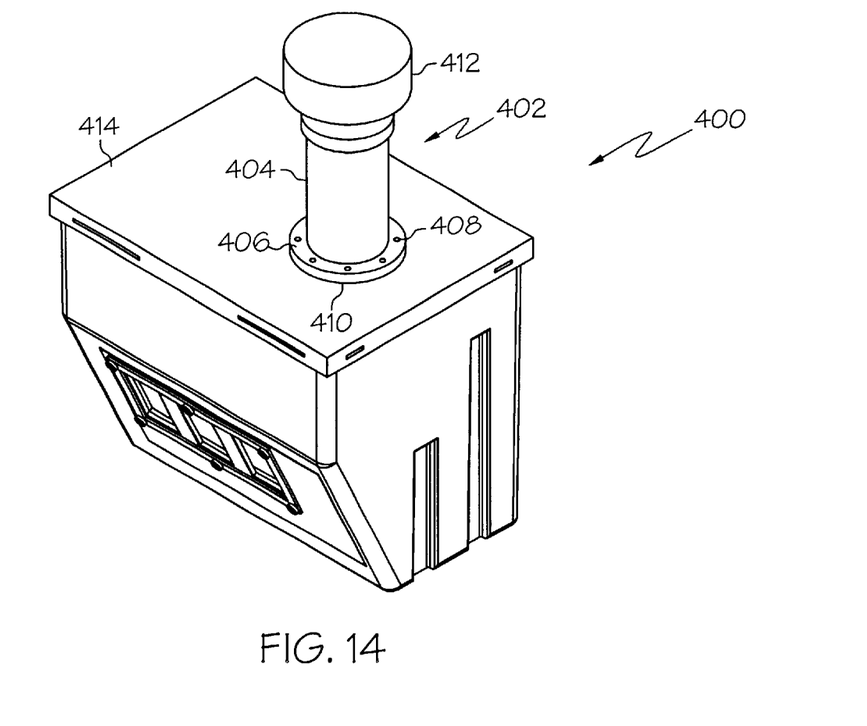
FIG. 14 is an alternative embodiment of a housing in accordance with the present invention.

As shown in FIG. 14, an alternative housing 400 may be provided and includes a vent 402. The vent 402 may be attached to or incorporated in the lid 414 to allow fluid level measurement and normal venting from the same tank opening, for example opening 208 as shown in FIG. 15. The vent 402 is in communication with the interior of the tank, for example via passageway 174 in the swivel base 106 and one or more passageways 161 in the swivel top 104, and an associated vent opening (not shown) in the bottom of the housing. The lid 414, for example, may have a two inch diameter opening (not shown). A vent pipe 404, such as a PVC pipe, may be mounted to the opening by a pipe flange 406 attached to or integral with the vent pipe 404. The flange 406 may include a plurality of openings 408 for receiving conventional fasteners such as rivets or screws, to attach the vent 402 to the lid 414. A gasket 410 may be positioned between the bottom of the flange 406 and portions of the lid 414 adjacent the opening in order to prevent vapor release and contamination. A pressure vacuum vent 412 is then attached to the distal end of the vent pipe 404. Alternatively, the pressure vacuum vent 412 could be directly mounted to the apparatus 100 without the pipe 404. For instance, the pressure vacuum vent 412 could be mounted directly to the housing 102, for example, on the lid 126/414. Accordingly, the apparatus may be used as a fluid level measuring apparatus while still allowing the tank opening to be used for normal venting.

The apparatus 100 may also include an alarm system for indicating a maximum fluid level in the tank. For instance, as shown in FIG. 15, in one embodiment the alarm system may include a switch 218 that activates a speaker 220 to give an audio warning. Once the float 112 rises to a predetermined level, the float 112 activates the alarm by contacting the switch 218. Other embodiments of an alarm system could also be incorporated. For instance, a magnet could be provided on one of the gears 188,189,190 to trigger an alarm once a maximum rotation of the gears has occurred. The alarm system could also be separately added to the apparatus.

One of ordinary skill will appreciate that while various seals have been described herein, all rivets, screws, or other fasteners used in the housing should be sealed with a gasket or otherwise in order to prevent vapor leakage and contamination. For various practical applications, it is also preferable that the housing be capable of holding about 2 inches of $H_2O$ column pressure or about 3.5 psi above ground.

The method of using the fluid level measuring apparatus 100 will now be described. Prior to the installation of the apparatus, the actual fluid level is measured by a conventional means, such as a dip stick or other measuring device, to accurately calibrate the apparatus. The apparatus 100 is assembled outside of the tank 202 and then mounted on the tank opening 208. The apparatus 100 is installed by inserting the rod 108 and float 112 through the opening 208 and into the interior of the tank 202. The weight of the second rod 154 causes the second rod 154 to telescope from the first rod 152 until the foot 110 rests adjacent the bottom 216 of the tank 202. A torquing tool, such as a wrench, is used to engage the outer surface portion 142 of the swivel bottom 106 and the swivel bottom 106 is tightened on the threaded opening 208 of the tank 202. Once the apparatus has been attached to the tank 202, the float 112 maintains an elevation along the rod 108 corresponding to the fluid level 204 in the tank 202. The biasing member 182 urges the spool 176 to rotate in order to automatically uptake portions of the elongated flexible member 114. The spool 176 communicates with the level indicator 184 as the spool 176 rotates to uptake portions of the elongated flexible member 114. Once the system reaches equilibrium, the lid 126 is removed and the level indicator 184 is calibrated to the actual fluid level previously measured by a conventional means. Calibration is achieved by laterally moving a selected one of the three gears 188,189,190 against the force of the biasing spring 165 to disengage the selected gear from communication with the spool 176. The selected gear is then rotated to display the appropriate indicia representing the actual fluid level. The process is repeated for the remaining gears until the actual fluid level is displayed. When looking down on the labels 120 from above, the numbers are different from the numbers actually displayed through the cut-out windows 118. A conversion table may be provided with a booklet or otherwise printed on the housing 102 (e.g., on the lid 126 of the housing) for determining which number is displayed in the window corresponding to the number viewed from above. Once calibrated, the lid 126 with the gasket 128 is closed to prevent vapor release and contamination. The housing 102 may then be rotated about a vertical axis such that the angled face 116 is directed towards the frequent location of an observer. Once located, the set screws 136 may be tightened to prevent any further rotation of the housing 102.

After the initial installation, the apparatus 100 will automatically display the current fluid level 204 in the tank 202. For instance, as the fluid 206 is removed from the tank 202, the fluid level 204 decreases, thereby causing the float 112 to slide downwardly on the rod 108 away from the housing 102 and the level indicator 184. As the tank 202 is emptied, the float 112 continues to slide downwardly until the float 112 abuts the foot 110. While the float 112 is moving downwardly, the elongated flexible member 114 is unwound from the spool 176, thereby causing the spool 176 to rotate. The rotation of the spool is communicated to the level indicator 184 which translates the spool rotation to display the current measured fluid level 204 according to the location of the float 112 in the tank 202. Hence, the level indicator 184 automatically displays the measured fluid level 204 by continuously adjusting the displayed indicia as the fluid level 204 changes.

Similarly, as the tank 202 is filled, the fluid level 204 increases, thereby causing the float 112 to slide upwardly on the rod 108 toward the level indicator 184. The float 112 continues to slide upwardly as the fluid level 204 increases until the float 112 abuts the connecting tube 148. While the float 112 is moving upwardly, the spool 176 automatically uptakes unused portions or lengths of the elongated flexible member 114, thereby causing the spool 176 to rotate. The rotation of the spool is communicated to the level indicator 184 which translates the spool rotation to display the current measured fluid level 204 according to the location of the float 112 in the tank 202.

Having shown and described the preferred embodiments of the present invention, further adaptations of the methods and apparatus described herein can be accomplished by appropriate modifications by one of ordinary skill in the art without departing from the scope of the present invention. Several of such potential modifications have been mentioned, and others will be apparent to those skilled in the art. Accordingly, the scope of the present invention should be considered in terms of the following claims and is understood not to be limited to the details of structure and operation shown and described in the specification and drawings.

What is claimed is:

1. An apparatus for measuring a fluid level, comprising:
   a) a housing including a level indicator adapted to display a measured fluid level;
   b) at least one rod extending from the housing;
   c) a float adapted to travel along the rod;
   d) an elongated flexible member having a first end and a second end, the first end being attached to the float;
   e) a spool adapted to store at least a portion of the elongated flexible member, and the second end of the elongated flexible member being attached to the spool; and
   f) a biasing member adapted to urge the spool to automatically uptake portions of the elongated flexible member as the float travels towards the housing and adapted to allow the elongated flexible member to unwind from the spool as the float travels away from the housing.

2. The apparatus according to claim 1, wherein the at least one rod is adjustable in length.

3. The apparatus according to claim 2, wherein the rod comprises a first rod and a second rod, and wherein the second rod is adjustable relative to the first rod.

4. The apparatus according to claim 3, wherein the second rod is in telescoping relation to the first rod.

5. The apparatus according to claim 1, wherein the float comprises a first end and a second end, wherein a through hole extends through the float from the first end to the second end, and further wherein the rod extends through the through hole.

6. The apparatus according to claim 5, wherein the through hole is provided with at least one beveled end portion.

7. The apparatus according to claim 6, wherein the beveled end portion has a conical surface.

8. The apparatus according to claim 1, wherein the float further comprises a bracket, and wherein the first end of the elongated flexible member is attached to the bracket of the float.

9. The apparatus according to claim 1, further comprising a foot attached to a distal end of the rod.

10. The apparatus according to claim 1, wherein the housing comprises an angled face adapted to display a measured fluid level in a direction downwardly and outwardly from the housing.

11. The apparatus according to claim 1, further comprising an alarm adapted to signal a predetermined fluid level in a tank.

12. The apparatus according to claim 1, wherein the at least one rod comprises at least two coaxial rods.

13. An apparatus for measuring a fluid level, comprising:
   a) a housing including a level indicator adapted to display a measured fluid level;
   b) at least one rod extending from the housing;
   c) a swivel top attached to the housing and a swivel bottom rotatably attached to the swivel top, wherein a proximal end portion of the rod is attached to the swivel top, and whereby the housing is rotatable relative to the swivel bottom;

d) a float adapted to travel along the rod;
e) an elongated flexible member having a first end and a second end, the first end being attached to the float;
f) a spool adapted to store at least a portion of the elongated flexible member, and the second end of the elongated flexible member being attached to the spool; and
g) a biasing member adapted to urge the spool to automatically uptake portions of the elongated flexible member as the float travels towards the housing and adapted to allow the elongated flexible member to unwind from the spool as the float travels away from the housing.

14. The apparatus according to claim 13, wherein the swivel bottom comprises exterior male threads adapted to engage a tank opening.

15. The apparatus according to claim 13, wherein the swivel bottom comprises interior female threads adapted to engage a tank opening.

16. The apparatus according to claim 13, wherein the swivel top is formed with a guide hole, and the elongated flexible member extends through the guide hole.

17. The apparatus according to claim 13, wherein at least one set screw is threaded into the swivel top for engaging the swivel bottom.

18. An apparatus for measuring a fluid level, comprising:
a) a housing including a level indicator adapted to display a measured fluid level;
b) at least one rod extending from the housing;
c) a float adapted to travel along the rod;
d) an elongated flexible member having a first end and a second end, the first end being attached to the float;
e) a spool adapted to store at least a portion of the elongated flexible member, and the second end of the elongated flexible member being attached to the spool; and
f) a biasing member adapted to urge the spool to automatically uptake portions of the elongated flexible member as the float travels towards the housing and adapted to allow the elongated flexible member to unwind from the spool as the float travels away from the housing, wherein the biasing member comprises a spring and the level indicator includes a plurality of readout gears in communication with the spool, the readout gears each including indicia for displaying a measured fluid level, the readout gears being rotatably mounted on a first shaft, a spring storage spool adapted to store portions of the spring, and at least two indexing gears, the indexing gears and the storage spool being rotatably mounted on a second shaft.

19. An apparatus for measuring a fluid level, comprising:
a) a housing including a level indicator adapted to display a measured fluid level;
b) at least one rod extending from the housing;
c) a float adapted to travel along the rod;
d) an elongated flexible member having a first end and a second end, the first end being attached to the float;
e) a spool adapted to store at least a portion of the elongated flexible member, and the second end of the elongated flexible member being attached to the spool;
f) a biasing member adapted to urge the spool to automatically uptake portions of the elongated flexible member as the float travels towards the housing and adapted to allow the elongated flexible member to unwind from the spool as the float travels away from the housing; and
g) a vent apparatus.

20. The apparatus according to claim 19, wherein the vent apparatus comprises a pressure vacuum vent.

21. The apparatus according to claim 19, wherein the vent apparatus comprises a vent pipe and a pressure vacuum vent mounted on an end of the vent pipe.

22. The apparatus according to claim 19, wherein the housing includes a lid defining a vent opening and wherein the vent apparatus is mounted on the lid over the vent opening.

23. A tank assembly comprising:
a) a tank defining an interior portion and provided with an opening;
b) a fluid located in the interior portion of the tank, wherein the fluid defines a fluid level; and
c) an apparatus attached to the opening of the tank, the apparatus comprising:
i) a housing including a level indicator adapted to display a measured fluid level in the tank;
ii) an adjustable rod extending from the housing into the interior portion of the tank, the rod including a first rod and a second rod in telescoping relation to the first rod;
iii) a float adapted to travel along the adjustable rod, the float comprising a first end and a second end, wherein a through hole extends through the float from the first end to the second end, and further wherein the adjustable rod extends through the through hole;
iv) an elongated flexible member having a first end and a second end, the first end being attached to the float;
v) a spool adapted to store at least a portion of the elongated flexible member, the second end of the elongated flexible member being attached to the spool; and
vi) a biasing member adapted to urge the spool to automatically uptake portions of the elongated flexible member as the float travels towards the housing and adapted to allow the elongated flexible member to unwind from the spool as the float travels away from the housing.

24. The tank assembly according to claim 23, wherein the through hole is provided with at least one beveled end portion including a conical surface.

25. The tank assembly according to claim 23, wherein the housing comprises an angled face adapted to display a measured fluid level in a direction downwardly and outwardly from the housing.

26. The tank assembly according to claim 23, further comprising an alarm adapted to signal a predetermined fluid level in the tank.

27. A tank assembly comprising:
a) a tank defining an interior portion and provided with an opening;
b) a fluid located in the interior portion of the tank, wherein the fluid defines a fluid level; and
c) an apparatus attached to the opening of the tank, the apparatus comprising:
i) a housing including a level indicator adapted to display a measured fluid level in the tank;
ii) an adjustable rod extending from the housing into the interior portion of the tank, the rod including a first rod and a second rod in telescoping relation to the first rod;

iii) a swivel top attached to the housing and a swivel bottom rotatably attached to the swivel top, wherein a proximal end portion of the adjustable rod is attached to the swivel top, and whereby the housing is rotatable relative to the swivel bottom;

iv) a float adapted to travel along the adjustable rod, the float comprising a first end and a second end, wherein a through hole extends through the float from the first end to the second end, and further wherein the adjustable rod extends through the through hole;

v) an elongated flexible member having a first end and a second end, the first end being attached to the float;

vi) a spool adapted to store at least a portion of the elongated flexible member, the second end of the elongated flexible member being attached to the spool; and vii) a biasing member adapted to urge the spool to automatically uptake portions of the elongated flexible member as the float travels towards the housing and adapted to allow the elongated flexible member to unwind from the spool as the float travels away from the housing.

28. The tank assembly according to claim 27, wherein the swivel bottom is attached to the tank and wherein the swivel bottom comprises threads engaging the opening of the tank.

29. The tank assembly according to claim 27, wherein the swivel top is provided with a guide hole, and the elongated flexible member extends through the guide hole.

30. A tank assembly comprising:

a) a tank defining an interior portion and provided with an opening;

b) a fluid located in the interior portion of the tank, wherein the fluid defines a fluid level; and c) an apparatus attached to the opening of the tank, the apparatus comprising:
  i) a housing including a level indicator adapted to display a measured fluid level in the tank;
  ii) an adjustable rod extending from the housing into the interior portion of the tank, the rod including a first rod and a second rod in telescoping relation to the first rod;
  iii) a float adapted to travel along the adjustable rod, the float comprising a first end and a second end, wherein a through hole extends through the float from the first end to the second end, and further wherein the adjustable rod extends through the through hole;
  iv) an elongated flexible member having a first end and a second end, the first end being attached to the float;
  v) a spool adapted to store at least a portion of the elongated flexible member, the second end of the elongated flexible member being attached to the spool; and
  vi) a biasing member adapted to urge the spool to automatically uptake portions of the elongated flexible member as the float travels towards the housing and adapted to allow the elongated flexible member to unwind from the spool as the float travels away from the housing, wherein the biasing member comprises a spring and the level indicator includes a plurality of readout gears in communication with the spool, the readout gears each including indicia for displaying a measured fluid level in the tank, the readout gears being rotatably mounted on a first shaft, a spring storage spool adapted to store portions of the spring, and at least two indexing gears, the indexing gears and storage spool being rotatably mounted on a second shaft.

31. A tank assembly comprising:

a) a tank defining an interior portion and provided with an opening;

b) a fluid located in the interior portion of the tank, wherein the fluid defines a fluid level; and c) an apparatus attached to the opening of the tank, the apparatus comprising:
  i) a housing including a level indicator adapted to display a measured fluid level in the tank;
  ii) an adjustable rod extending from the housing into the interior portion of the tank, the rod including a first rod and a second rod in telescoping relation to the first rod;
  iii) a float adapted to travel along the adjustable rod, the float comprising a first end and a second end, wherein a through hole extends through the float from the first end to the second end, and further wherein the adjustable rod extends through the through hole;
  iv) an elongated flexible member having a first end and a second end, the first end being attached to the float;
  v) a spool adapted to store at least a portion of the elongated flexible member, the second end of the elongated flexible member being attached to the spool;
  vi) a biasing member adapted to urge the spool to automatically uptake portions of the elongated flexible member as the float travels towards the housing and adapted to allow the elongated flexible member to unwind from the spool as the float travels away from the housing; and
  vii) a vent apparatus.

32. The tank assembly according to claim 31, wherein the vent apparatus comprises a pressure vacuum vent.

33. The tank assembly according to claim 31, wherein the vent apparatus comprises a vent pipe and a pressure vacuum vent mounted on an end of the vent pipe.

34. The apparatus according to claim 31, wherein the housing includes a lid defining a vent opening and wherein the vent apparatus is mounted on the lid over the vent opening.

* * * * *